(12) United States Patent
Suni et al.

(10) Patent No.: US 10,008,046 B2
(45) Date of Patent: Jun. 26, 2018

(54) METHOD, APPARATUS AND COMPUTER PROGRAM PRODUCT FOR ADAPTIVE VENUE ZOOMING IN A DIGITAL MAP INTERFACE

(71) Applicant: HERE Global B.V., Eindhoven (NL)

(72) Inventors: Mikko Suni, Kirkkonummi (FI); Astrid Dawson, Fürstenfeldbruck (DE); Stefan Gimeson, Berlin (DE); Igor Maliukh, Berlin (DE); Christian Magnus, Berlin (DE)

(73) Assignee: HERE Global B.V., Eindhoven (NL)

(*) Notice: Subject to any disclaimer, the term of this patent is extended or adjusted under 35 U.S.C. 154(b) by 52 days.

(21) Appl. No.: 15/196,417

(22) Filed: Jun. 29, 2016

(65) Prior Publication Data

US 2018/0005454 A1    Jan. 4, 2018

(51) Int. Cl.
*G06T 19/20* (2011.01)
*G06F 3/0481* (2013.01)
*G06F 3/0484* (2013.01)

(52) U.S. Cl.
CPC .......... *G06T 19/20* (2013.01); *G06F 3/04815* (2013.01); *G06F 3/04845* (2013.01);
(Continued)

(58) Field of Classification Search
CPC ........ G06F 2203/04806; G01C 21/367; G01C 21/3638; G09G 2340/045;
(Continued)

(56) References Cited

U.S. PATENT DOCUMENTS 6,559,888 B1   5/2003   Doron
8,116,593 B2 *  2/2012   Kondo ............... G06T 3/40
                                                345/660
(Continued)

FOREIGN PATENT DOCUMENTS

EP         2565583         3/2013

OTHER PUBLICATIONS

International Search Report and Written Opinion for corresponding International Application No. PCT/EP2017/065703, dated Sep. 8, 2017, 21 pages.

*Primary Examiner* — Barry Drennan
*Assistant Examiner* — Phong Nguyen
(74) *Attorney, Agent, or Firm* — Alston & Bird LLP

(57) ABSTRACT

A method, apparatus, and computer program product are provided for adaptive zoom control for zooming in on a venue beyond the maximum zoom level available in a digital map. An apparatus may be provided including at least one processor and at least one non-transitory memory including computer program code instructions. The computer program code instructions may be configured to, when executed, cause the apparatus to at least: provide for presentation of a map of a region including a venue; receive an input corresponding to a zoom-in action to view an enlarged portion of the region, where the enlarged portion of the region includes the venue; and in response to receiving the input corresponding to a zoom-in action to view the enlarged portion of the region, transition from the presentation of the map of the region to a presentation of a venue object corresponding to the venue.

17 Claims, 8 Drawing Sheets

US 10,008,046 B2
Page 2

(52) U.S. Cl.
CPC ............... *G06F 2203/04806* (2013.01); *G06T 2219/2016* (2013.01)

(58) Field of Classification Search
CPC . G09G 2340/0407; G06T 17/00; G06T 17/05; G06T 2219/00
USPC ........................................................ 345/419
See application file for complete search history.

(56) References Cited

U.S. PATENT DOCUMENTS

| | | |
|---|---|---|
| 8,363,068 B1 | 1/2013 | Miller et al. |
| 8,456,467 B1 * | 6/2013 | Hickman ............... G06T 15/005 345/419 |
| 8,471,849 B1 * | 6/2013 | Hickman ................ G06F 3/013 345/420 |
| 8,504,945 B2 | 8/2013 | Jakobson et al. |
| 8,600,619 B2 | 12/2013 | Bales et al. |
| 8,791,963 B2 | 7/2014 | Cui |
| 8,868,338 B1 | 10/2014 | Chau et al. |
| 8,928,657 B2 * | 1/2015 | Bailiang ................ G06T 15/08 345/419 |
| 9,134,886 B2 * | 9/2015 | Bailiang ............... G06F 3/0484 |
| 2004/0233222 A1 * | 11/2004 | Lee ....................... G06F 3/0481 345/621 |
| 2005/0285861 A1 * | 12/2005 | Fraser ................... G06T 11/206 345/428 |
| 2009/0310851 A1 * | 12/2009 | Arcas ....................... G06T 7/55 382/154 |
| 2010/0146436 A1 * | 6/2010 | Jakobson ............ G01C 21/3682 715/800 |
| 2011/0069086 A1 * | 3/2011 | Shoemaker ........... G06F 3/0481 345/641 |
| 2011/0191014 A1 | 8/2011 | Feng et al. |
| 2012/0206469 A1 * | 8/2012 | Hulubei ............... G09B 29/006 345/581 |
| 2013/0044962 A1 * | 2/2013 | Kim ....................... G06T 3/4053 382/254 |
| 2013/0050204 A1 * | 2/2013 | Samokhin .......... G01C 21/3638 345/419 |
| 2013/0111399 A1 * | 5/2013 | Rose ..................... G06T 3/0025 715/800 |
| 2013/0194260 A1 * | 8/2013 | Kunath .................. G06T 17/05 345/420 |
| 2014/0071119 A1 * | 3/2014 | Piemonte ................ G06T 17/05 345/419 |
| 2014/0267282 A1 * | 9/2014 | Ren ........................ G01C 21/00 345/428 |
| 2015/0049080 A1 | 2/2015 | Purayil et al. |
| 2015/0065243 A1 | 3/2015 | Mizrahi et al. |
| 2015/0120262 A1 * | 4/2015 | Dulac .................... G01V 1/325 703/6 |
| 2015/0145891 A1 | 5/2015 | Kuffner et al. |
| 2015/0181200 A1 * | 6/2015 | Arrasvuori ............... G06K 9/00 348/46 |
| 2015/0285654 A1 | 10/2015 | Kogler et al. |
| 2015/0354979 A1 * | 12/2015 | Cengil ............... G01C 21/3638 701/532 |
| 2016/0379405 A1 * | 12/2016 | Baca ....................... G06T 17/00 463/32 |

* cited by examiner

METHOD, APPARATUS AND COMPUTER PROGRAM PRODUCT FOR ADAPTIVE VENUE ZOOMING IN A DIGITAL MAP INTERFACE

TECHNOLOGICAL FIELD

An example embodiment of the present invention relates generally to providing maps for viewing, navigation, and informational purposes, and more particularly, to a method, apparatus and computer program product for providing a map having adaptive venue zoom to enable a greater level of detail to be displayed for map objects.

BACKGROUND

Maps have been used for centuries for providing route geometry and geographical information. Conventional paper maps including static images of geographic features such as buildings, venues, or points of interest from a snapshot in history have given way to digital maps presented on computers and mobile devices, and navigation has been enhanced through the use of graphical user interfaces.

While paper maps are necessarily limited by either the level of detail that can be provided in an adequate scale, or by the size of a region that can be depicted while maintaining sufficient detail, digital maps have much greater capacity for scope and detail. Digital maps may encompass all areas of the globe, with potentially differing degrees of detail available based on the density of objects or points of interest within the region depicted. A digital map may include all of Earth, but considering the size of populated land mass, the level of detail available at a ground level may be limited due to memory or processing restrictions. Further, a digital map may have a maximum level of zoom established based on the level of detail in the map and the size of objects depicted within the map.

BRIEF SUMMARY

A method, apparatus, and computer program product are therefore provided for adaptive zoom control for zooming in on a venue beyond the maximum zoom level available in a digital map. According to an example embodiment, an apparatus may be provided including at least one processor and at least one non-transitory memory including computer program code instructions. The computer program code instructions may be configured to, when executed, cause the apparatus to at least: provide for presentation of a map of a region including a venue; receive an input corresponding to a zoom-in action to view an enlarged portion of the region, where the enlarged portion of the region includes the venue; and in response to receiving the input corresponding to a zoom-in action to view the enlarged portion of the region, transition from the presentation of the map of the region to a presentation of a venue object corresponding to the venue. The venue object may be a three-dimensional model of the venue and the venue object may be initially presented in a scale corresponding to a view of the enlarged portion of the region.

According to some embodiments, the apparatus may further be caused to: receive an input during presentation of the venue object corresponding to a zoom-in action to view an enlarged venue object; and provide for display of the enlarged venue object. The enlarged venue object may be provided for display in a zoom level greater than a maximum zoom level available for presentation of the map. Causing the apparatus to provide for display of the enlarged venue object may further include causing the apparatus to provide for display of the three-dimensional model of the venue in an enlarged view in which the three-dimensional model is enlarged along an x-axis and a y-axis, but not enlarged along a z-axis corresponding to a height of the model. The z-axis may be orthogonal to a plane defined by the x-axis and y-axis.

Embodiments of the apparatus may further be configured to provide for display of a portion of the map in a virtual zoom level corresponding to a scale of the enlarged venue object, where a virtual zoom level comprises an enlarged view of the map greater than the maximum zoom level of the map. The virtual zoom level may correspond to a view of an enlarged venue object at a zoom level lower than the maximum zoom level of the map. The venue in the map of the region may include an anchor point, where the venue object includes an anchor point, and transitioning from the presentation of the map of the region to a presentation of a venue object corresponding to the venue may include aligning the anchor point of the venue object with a position on a display of the anchor point of the venue. The venue object may include embedded information for rendering an enlarged version of the venue object.

Embodiments of the present invention may provide a computer program product including at least one non-transitory computer-readable storage medium having computer-executable program code instructions stored therein. The computer-executable program code instructions may include program code instructions to: provide for presentation of a map of a region including a venue; receive an input corresponding to a zoom-in action to view an enlarged portion of the region, where the enlarged portion of the region includes the venue; and in response to receiving the input corresponding to a zoom-in action to view the enlarged portion of the region, transition from the presentation of the map of the region to a presentation of a venue object corresponding to the venue. The venue object may be a three-dimensional model of the venue, and the venue object may be initially presented in a scale corresponding to a scale of a view of the enlarged portion of the region.

The computer program product of example embodiments may optionally include program code instructions to: receive an input during presentation of the venue object corresponding to a zoom-in action to view an enlarged venue object; and provide for display of the enlarged venue object. The enlarged venue object may be provided for display in a zoom level greater than a maximum zoom level available for presentation of the map. The program code instructions to provide for display of the enlarged venue object may include program code instructions to: provide for display of the three-dimensional model of the venue in an enlarged view in which the three-dimensional model is enlarged along an x-axis and a y-axis, but not enlarged along a z-axis corresponding to a height of the model. The z-axis may be orthogonal to a plane defined by the x-axis and the y-axis.

According to some embodiments, the computer program product may include program code instructions to provide for display of a portion of the map in a virtual zoom level corresponding to a scale of the enlarged venue object, where a virtual zoom level includes an enlarged view of the map greater than the maximum zoom level of the map. The virtual zoom level may correspond to a view of an enlarged venue object at a zoom level lower than the maximum zoom level of the map. The venue in the map of the region may include an anchor point, where the venue object includes an anchor point, and where the program code instructions to transition from the presentation of the map of the region to a presentation of a venue object corresponding to the venue includes program code instructions to align the anchor point of the venue object with a position on a display of the anchor point of the venue. The venue object may include embedded information for rendering an enlarged version of the venue object.

Embodiments provided herein may include a method for adaptive zooming of a venue object. The method may include providing for presentation of a map of a region including a venue; receiving an input corresponding to a zoom-in action to view an enlarged portion of the region, where the enlarged portion of the region includes the venue; and in response to receiving the input corresponding to a zoom-in action to view the enlarged portion of the region, transitioning from the presentation of the map of the region to a presentation of a venue object corresponding to the venue. The venue object may be a three-dimensional model of the venue, and the venue object may initially be presented in a scale corresponding to a scale of a view of the enlarged portion of the region. Methods may include receiving an input during presentation of the venue object corresponding to a zoom-in action to view an enlarged venue object; and providing for display of the enlarged venue object. The enlarged venue object may be provided for display in a zoom level greater than a maximum zoom level available for presentation of the map.

According to some embodiments, providing for display of the enlarged venue object may further include providing for display of the three-dimensional model of the venue in an enlarged view in which the three-dimensional model is enlarged along an x-axis and a y-axis, but not along a z-axis corresponding to a height of the model, where the z-axis is orthogonal to a plane defined by the x-axis and the y-axis. Methods may include providing for display of a portion of the map in a virtual zoom level corresponding to a scale of the enlarged venue object, where a virtual zoom level comprises an enlarged view of the map greater than the maximum zoom level of the map. The virtual zoom level may correspond to a view of an enlarged venue object at a zoom level lower than the maximum zoom level of the map. The venue in the map of the region may include an anchor point, where the venue object also includes an anchor point, and transitioning from the presentation of the map of the region to a presentation of a venue object corresponding to the venue further includes aligning the anchor point of the venue object with a position on a display of the anchor point of the venue.

BRIEF DESCRIPTION OF THE DRAWINGS

Figure 1:
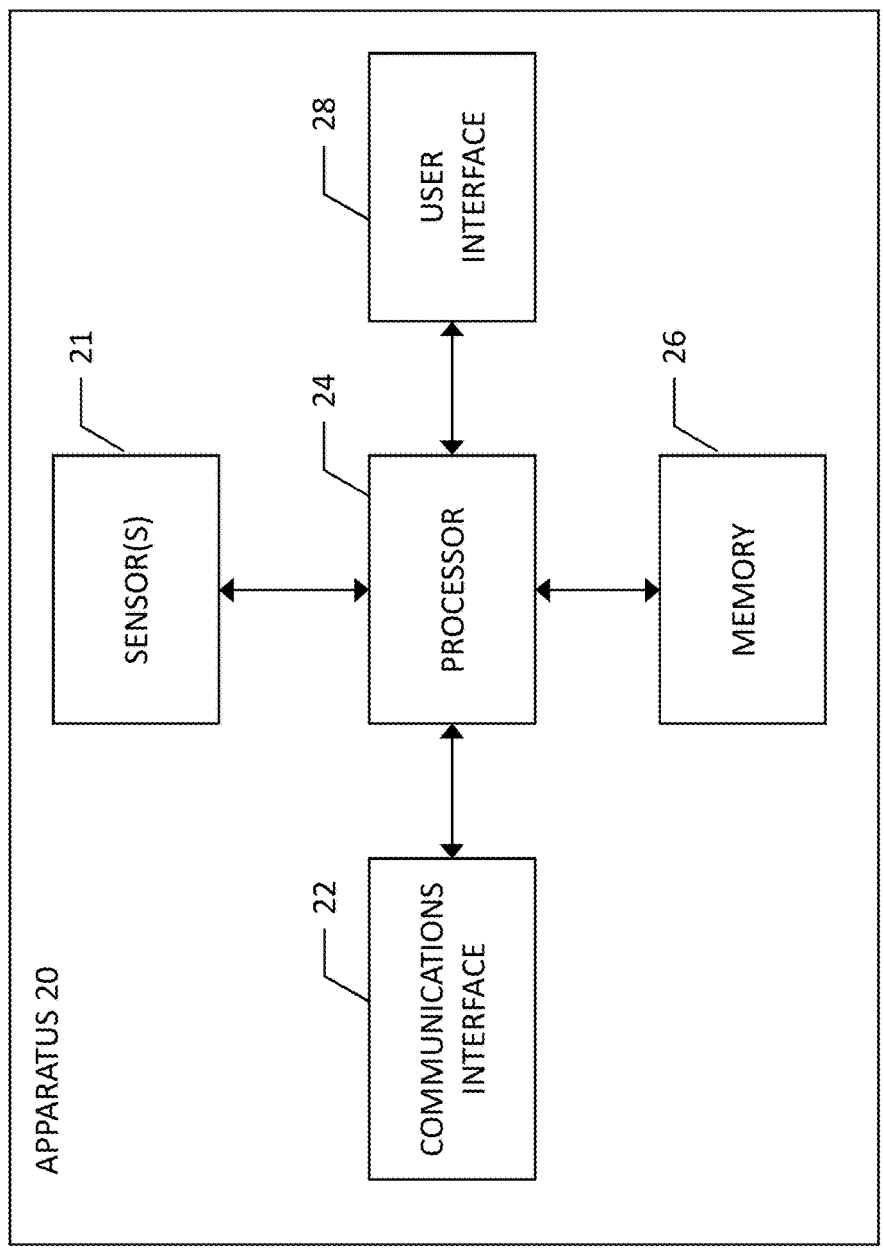
Figure 2:
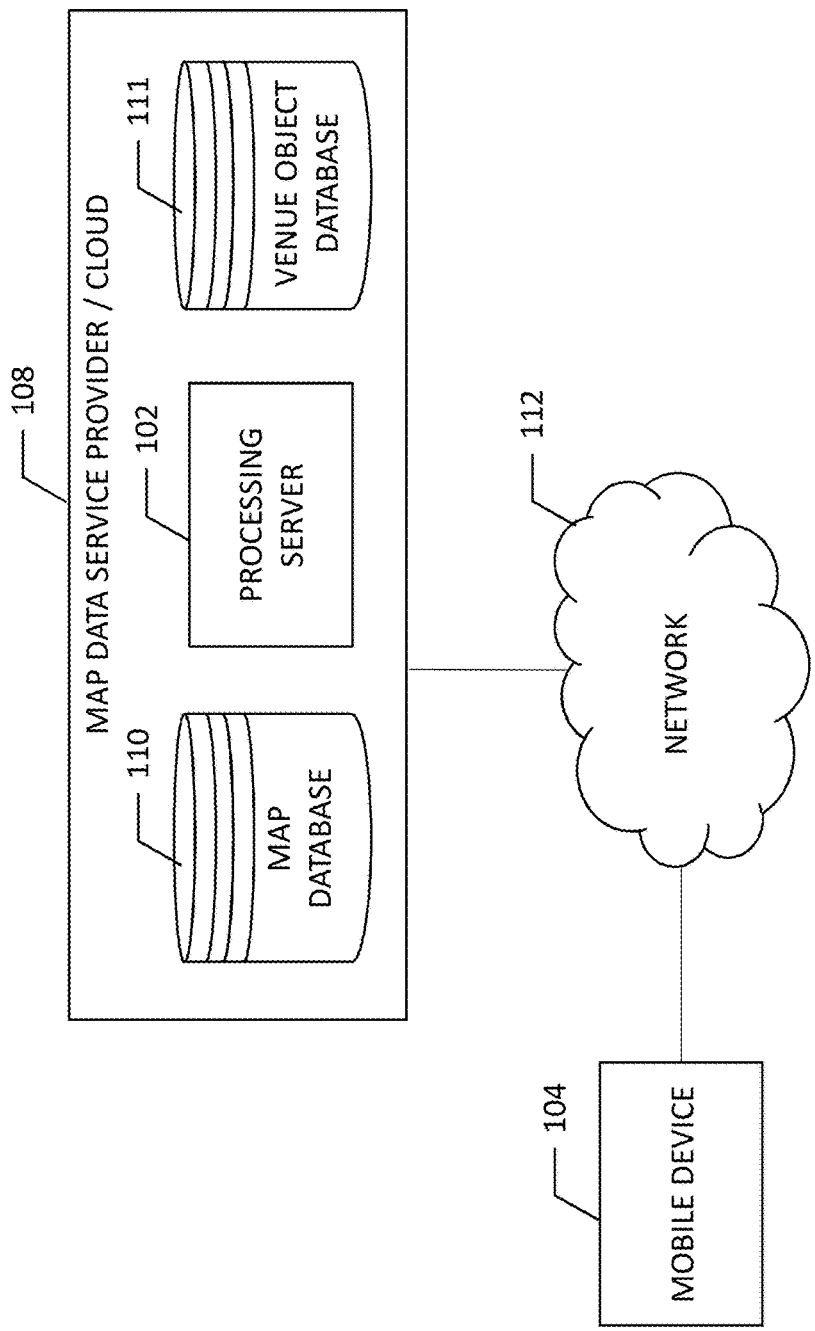
Figure 3:
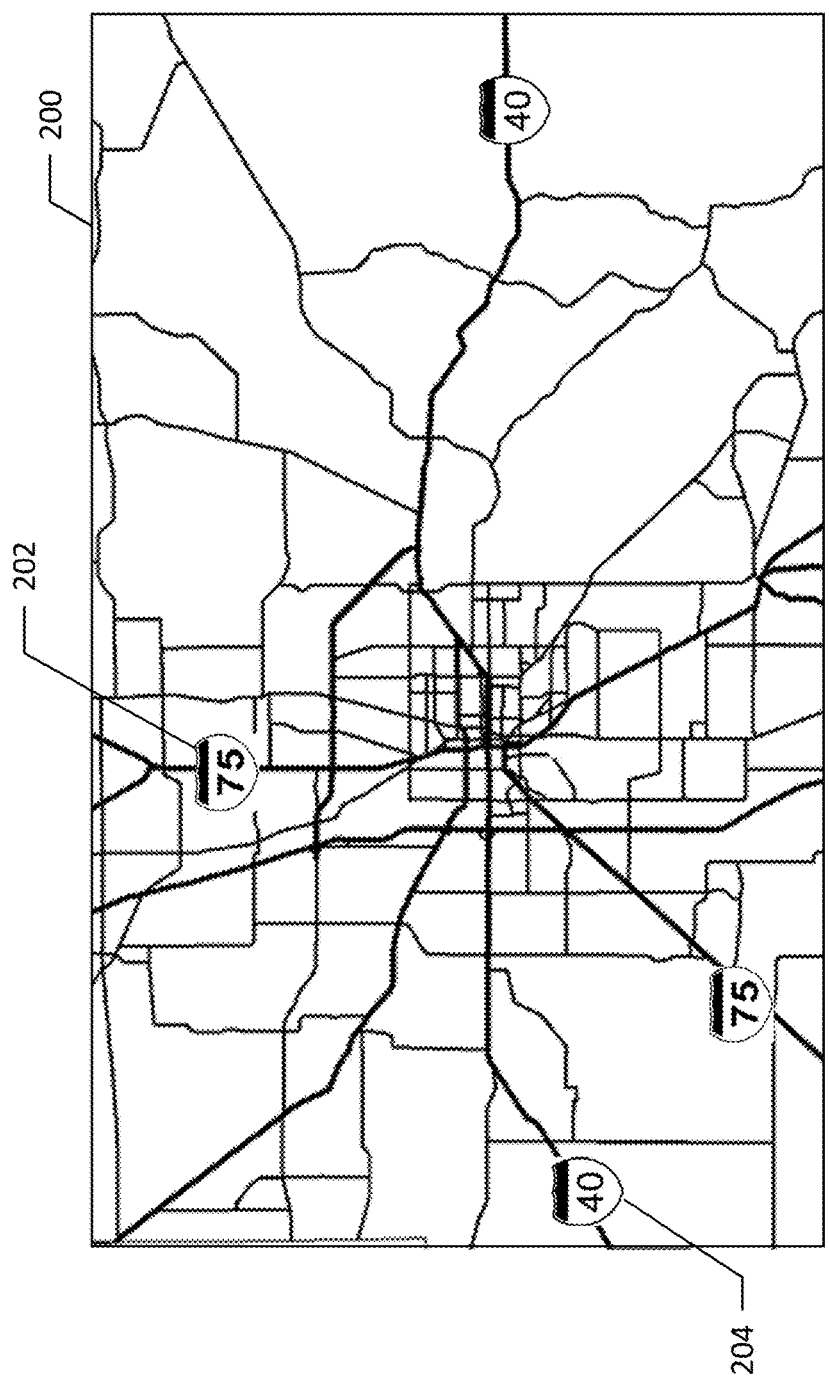
Figure 4:
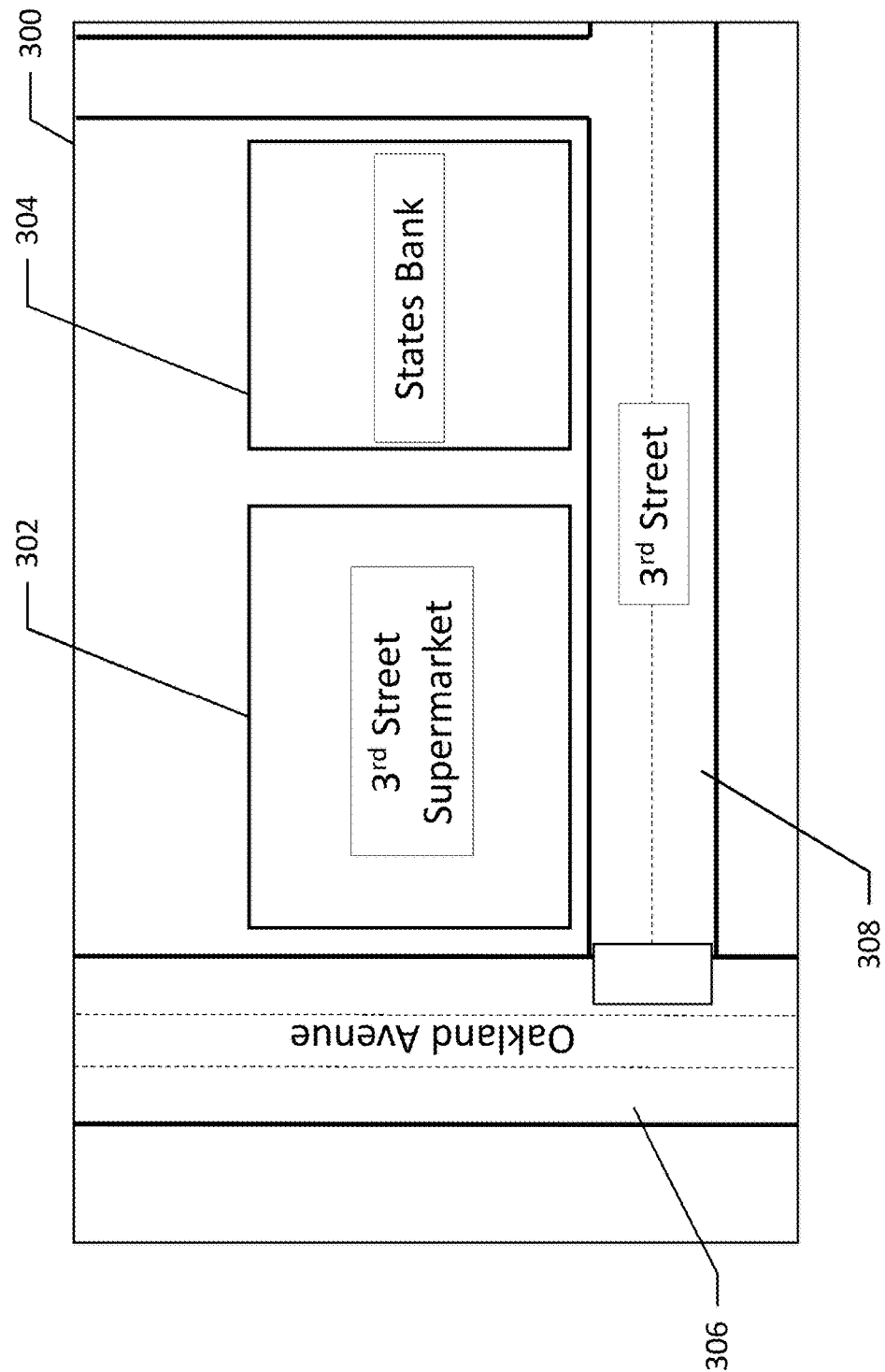
Figure 5:
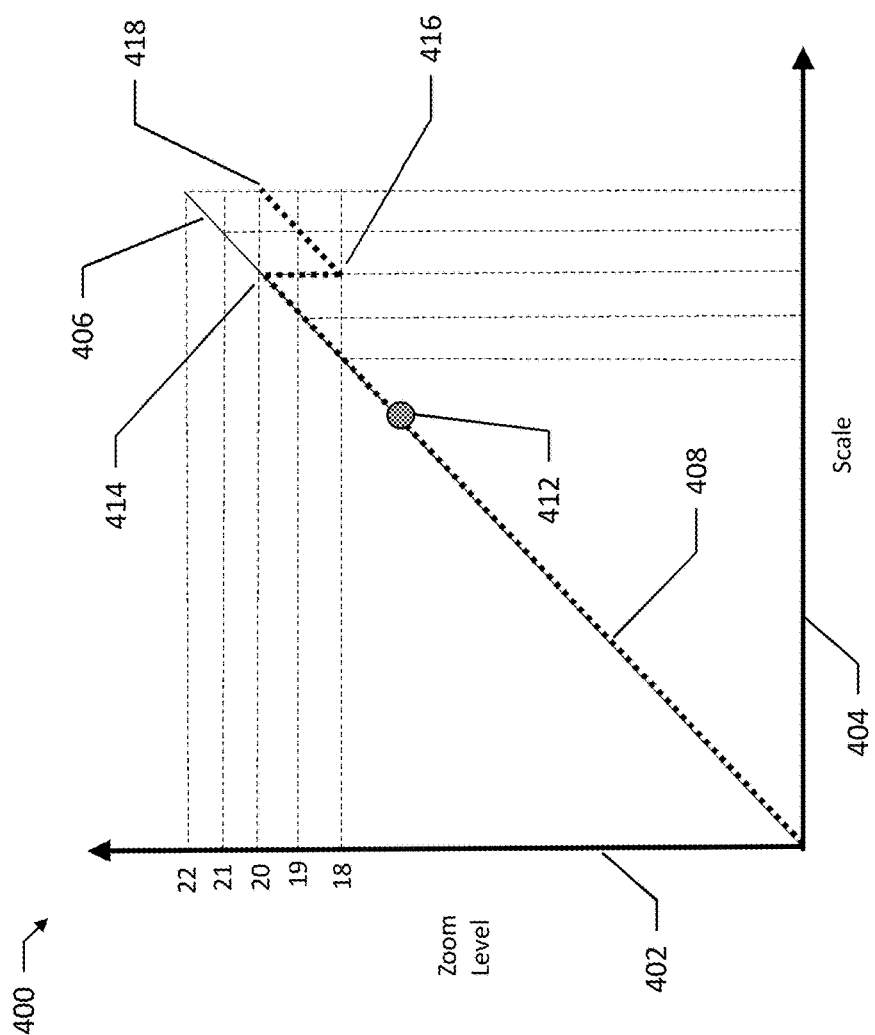
Figure 6:
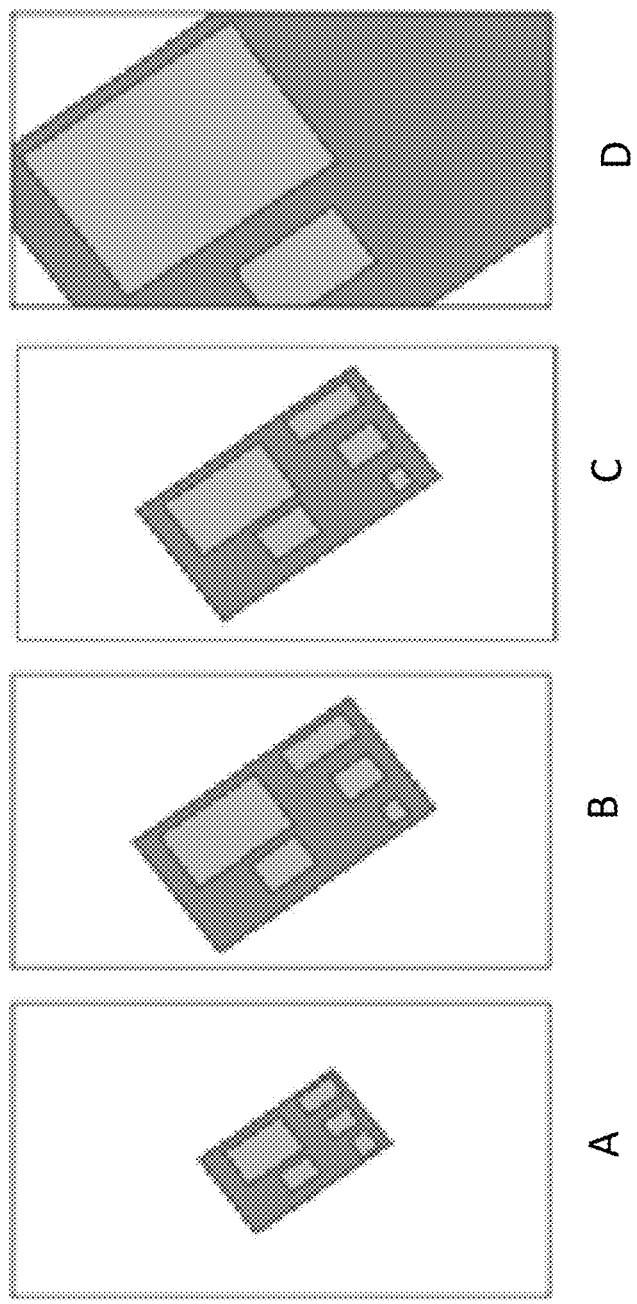
Figure 7:
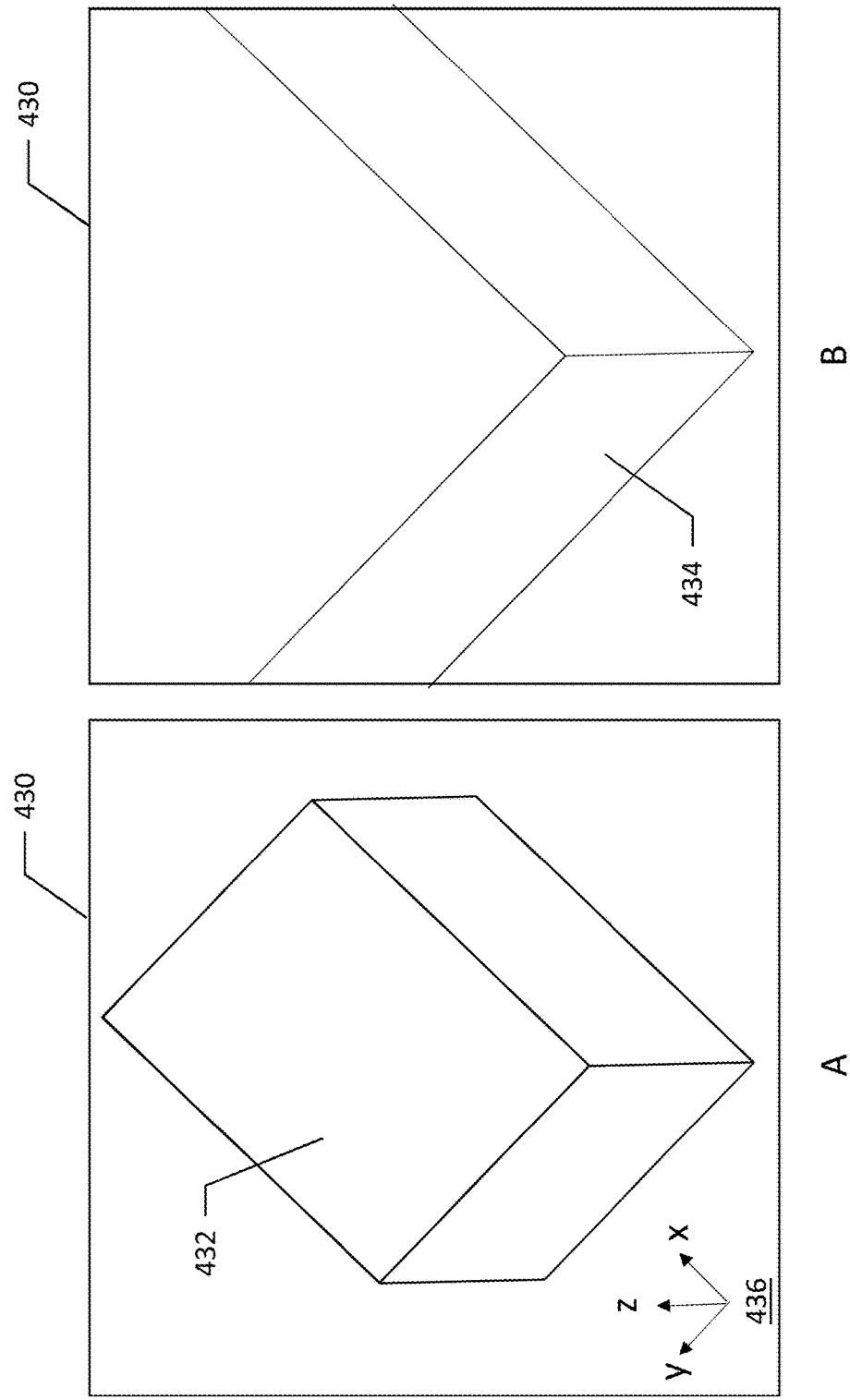
Figure 8:
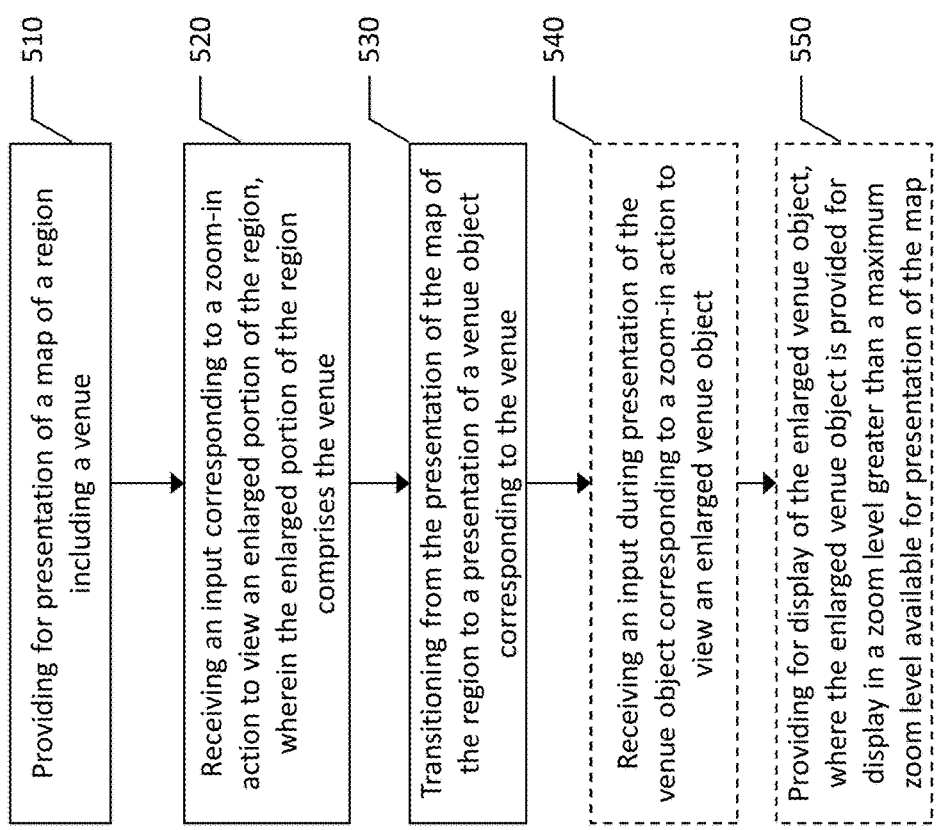

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system of implementing an adaptive venue zoom interface according to an example embodiment of the present invention;

FIG. 3 is a digital map presented on a digital map user interface according to an example embodiment of the present invention;

FIG. 4 is another digital map presented on a digital map user interface according to an example embodiment of the present invention;

FIG. 5 is an illustration of the relationship between zoom level and scale, and adaptive zooming using venue objects according to an example embodiment of the present invention;

FIG. 6 is an illustration of a series of images related to reference points along the zoom level/scale plot of FIG. 5 according to an example embodiment of the present invention;

FIG. 7 is an illustration of a pair of images related to the adaptive zoom of a venue object according to an example embodiment of the present invention; and FIG. 8 is a flowchart of a method of adaptive zoom control using venue objects according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing an adaptive zoom interface for a digital map, and more particularly, to an adaptive venue zoom that enables a greater level of detail to be provided for venues, such as buildings, points-of-interest, etc., than can be provided in conventional digital maps. A digital map may provide a great deal of information about a vast amount of space; however, the information regarding individual venues may be limited by memory or processing capacity associated with a device accessing the digital map or employing a digital map interface application.

Conventional digital maps may have a maximum zoom level, described further below, beyond which zooming in of the map is not available. Embodiments described herein provide an apparatus, method, and computer program product, to enable zooming in on a venue (e.g., building, point of interest, etc.), specifically a venue object, to obtain a zoom level greater than a maximum zoom level of the map. This adaptive venue zoom may enable a user to view details within a venue, such as seats within a theater, or shelves within a store, for example.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, desktop computer, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may optionally be equipped with any number of sensors 21, such as a global positioning system (GPS), accelerometer, and/or gyroscope, for facilitating location determination. Such sensors may be particularly useful in implementations in which navigation or route guidance services of a map provider are desirable. Optionally, the sensors may include environmental sensors for determining temperature, humidity, ambient light, etc. As such, sensors 21 as described herein can be any number of sensors used to provide information concerning an environment or location of an apparatus 20.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application or interface with a map data service provider so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

According to an example embodiment, adaptive venue zoom may be implemented in conjunction with or in addition to a map data service provider. The adaptive venue zoom functionality may be provided as supplemental functionality that is implemented locally on a device (e.g., apparatus 20), or provided via the map data service provider that also provides geographic map data. In this manner, the adaptive venue zoom may be implemented as an overlay feature to conventional digital maps or to substitute for the display of a digital map upon a zoom level reaching a maximum zoom level of the digital map. As further described below, the adaptive venue zoom may be implemented in a seamless manner to provide a high quality user interface experience such that a transition between a digital map view and an adaptive venue zoom function is unnoticed by a user.

A map service provider database may be used to provide an interactive digital map to a user. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data, or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

As will be described further below, according to some example embodiments, the map service provider may include in the map database 110 or a separate memory or database such as venue object database 111, a repository of venue objects that provide a high level of detail relative to specific venues. These venue objects may include three dimensional models of the venue including modeling of at least a portion of an interior of the venue, such as shelves in a supermarket or seats in an amphitheater, for example. These venue objects may be associated with a specific venue identified by a location on the digital map, such as an anchor point of the venue, as described further below.

The map database 110 and the venue object database 111 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. Further, the map data service provider can collect venue information to generate and enhance the venue object database 111. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. Further, databases of architectural features and layouts may be accessed to facilitate the generation of venue objects may be stored in the venue object database 111. The most ubiquitous form of map data that may be available is vehicle data provided by vehicles, such as mobile device 104, as they travel the roads throughout a region, while the most widely available form of venue object data may come from venue owners, building developers, or venue proprietors, for example.

The map database 110 and the venue object database 111 may be a master databases stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

As mentioned above, the map data service provider 108 map database 110 and venue object database 111 may be master databases, but in alternate embodiments, a client side database may represent a compiled map and/or venue object database that may be used in or with end user devices (e.g., mobile device 104) to provide navigation and/or map-related functions. For example, the map database 110 and venue object database 111 may be used with the mobile device 104 to provide an end user with navigation features. In such a case, the map database 110 and venue object database 111 can be downloaded (in whole or in part) or stored on the end user device which can access the map database 110 and venue object database 111 through a wireless or wired connection, such as via a processing server 102 and/or the network 112, for example.

FIG. 3 illustrates an example embodiment of a digital map 200 provided for display including a low zoom level depicting a road network of a region. As shown, the zoom level is low enough that only the most major roadways are enumerated through markers 202 and 204. The illustrated digital map may be depicted in, for example, zoom level 12. The level of zoom is a measure of how large of a region is depicted in the map. Conventional maps are measured using a "scale" where a measure on a paper map is equated to a larger measure of the region depicted in the map (e.g., 1 inch=1 mile or 1 centimeter=1 kilometer), or in a ratio (e.g., 1:63,000, which is approximately equivalent to 1 inch=1 mile, or 1:100,000 which is equivalent to 1 cm=1 km). However, this type of scale does not lend well to the presentation of maps on digital displays of varying size. The display size alters the scale ratio presented, such that "zoom levels" are used herein to describe a consistent level of zoom regardless of the size of the display. Further, digital maps are generally limited to a certain degree of zoom, or a "maximum zoom level," after which zooming in is no longer available. This maximum zoom level equates to a zoom level as described herein and not to a scale ratio due to the aforementioned issues.

A zoom level, as described herein, is a level of zoom beginning with the highest, least granular view of a map. According to an example embodiment in which the Earth is mapped in a digital map, a view of the entire Earth, whether in a substantially spherical presentation or laid flat in two-dimensions, equates to "zoom level 1". In this manner, zoom level 1 may depict a region that is approximately 25,000 miles (40,000 km) across, while the dimension from top to bottom (north to south) may be relatively smaller due to a lack of mapped regions at the poles of the Earth. Zoom level 2 is achieved by dividing zoom level 1 into quadrants, bisecting zoom level 1 equally both vertically and horizontally, such that zoom level 2 includes a region approximately 12,500 miles (20,000 km) across. Using this progression, zoom level 8, for example, would include a region approximately 200 miles (~320 km) across. Zooming in further to level 16, would result in a depicted region of about three-quarters of a mile or 1.2 km across. The maximum zoom level available in the digital map may include, for example, a zoom level of 20, which includes a depicted region of about 250 feet or 76 meters across, which is approximately the length of a typical city block in New York City.

While the degree of zoom or level of scale as described herein is described in "zoom levels", these zoom levels are a representative measure of zoom. As such, the "zoom levels" described herein are not intended to be limiting to specific zoom steps or increments of digital maps, but indicative of the degree of zoom of a digital map. Therefore, whether the maximum zoom level is a "zoom level 20" or a zoom to 200 feet (or 61 meters) across a display, one of ordinary skill in the art will appreciate the equivalence there between and the arbitrary assignment of zoom levels as merely indicative of a degree of zoom attainable by a digital map interface.

The level of detail provided in a digital map may be dependent upon the degree of detail available in the digital map database, such as database 110. For example, the detail shown for a portion of a map in a rural region with sparse roadways may be little more than indications of the roadways and their associated names or identifying numbers. Conversely, in a dense urban region a map may depict roadways, names or identifying numbers of the roadways and points of interest (e.g., gas stations, banks, restaurants, etc.). These points of interest may be identified by icons, text names, or the like.

FIG. 4 illustrates an example embodiment of a digital map of a region 300 viewed at zoom level 20, or the maximum zoom level of an example embodiment of a digital map interface. As illustrated, the illustrated map region includes a greater level of detail than available in the zoom level 12 of FIG. 3, where roadway names are shown at 306 and 308, together with an indication of the number of lanes in each road. Further information may be shown, such as directional indicators for one-way streets, traffic signal/sign markers, traffic congestion levels, etc. These features are well known in the art such that they are not illustrated herein. Also shown are points of interest including a supermarket 302 and a bank 304. These buildings are shown as polygons roughly approximating the shape of the building housing each business. While the level of zoom presented in FIG. 4 may be sufficient for certain uses, such as locating a point of interest on the map, further zooming may be desirable to determine more detail about a point of interest or venue.

Provided herein is an apparatus, method, and computer program product in which additional zooming may be facilitated. As shown in FIG. 4, a mapped venue may be an object having a defined polygon shape. A venue depicted in a digital map may include a three-dimensional model, a polygon, or raster image of the venue or building presented on the digital map. The venue depicted on the digital map may be of a scale equivalent to that of the digital map, such that zooming of the venue on the digital map suffers from the same limitations of zooming on the digital map. When zooming in beyond the standard maximum zoom level, the zoom mechanism of example embodiments may actually zoom out in order to make it possible to continue to use a zoom-in gesture (e.g., a pinch gesture) to continue zooming in. The mechanism of example embodiments may also replace the regular polygon shapes (or normal scale three-dimensional model or raster image of a venue depicted on the map) with enlarged polygons (or an enlarged-scale three-dimensional model of the venue) which are embedded in the venue objects. These polygons (or models) are scaled in a normal scale with the digital map in such a way that at the point of time when the enlarged polygons (or enlarged-scale models) are taken into use (e.g., when the enlarged polygons replace the regular polygon shapes as shown in FIG. 4), the size of the enlarged polygons mimic the size of the regular polygon shapes to provide a smooth zooming experience for a user from a zoom level attainable by the digital map interface to a zoom level provided by the adaptive venue zoom interface that would not be attainable in the digital map interface.

According to one example embodiment of the present invention, in order to provide further zooming to a greater zoom level on a venue within the map, a venue on the digital map is replaced with a venue object that is an enlarged three-dimensional model of the venue, scaled down to match the zoom level of the map as the zoom level of the map approaches the maximum zoom level. In practice, as the zoom level of a digital map increases to a threshold value, adaptive venue zooming is triggered. The threshold may be dependent upon the scale of the enlarged three dimensional model used for the venue object.

According to some embodiments, a venue on the digital map, which may include a polygon, a normal scale three dimensional model or raster image, and a large scale venue object may each be generated. When zoomed in to a first threshold zoom level, the normal scale venue may be presented on the digital map interface. The term "normal scale" refers to the venue's scale relative to the map, with a "normal scale" being a venue of a scale that matches that of the digital map. In response to the zoom level reaching a second threshold zoom level (e.g., the maximum zoom level), the normal scale venue (which cannot be zoomed-in further) is replaced with the large scale venue object or enlarged venue object. Merely replacing the normal scale venue with the large scale venue object would result in an undesirable, sudden scale change of the object presented to a user, appearing as a sudden zoom-in. In order to produce a smooth zooming experience, at the time the normal scale venue is replaced with the large scale venue object, the zoom level is decreased commensurately with the scale of the large scale venue object (e.g., two levels in an instance in which a large scale venue object is four times bigger than a normal scale venue), such that the large scale venue object appears in a similar size to the normal scale venue at the second threshold zoom level, which may be the maximum zoom level. This replacement and zoom-out functionality enables a user to continue zooming in until the max zoom level is reached in which the large scale venue object appears in full scale (e.g., four times bigger than the normal scale venue in the aforementioned example). This functionality provides a smooth zooming operation where the venue object can be viewed at a scale considerably larger than the maximum zoom level of the digital map.

According to the aforementioned example embodiment, the digital map itself may be replaced, such as with a non-transparent polygon, to render the underlying, original digital map not visible, since the large scale venue object would appear in a size inconsistent with the digital map. This may be unnecessary in an instance in which the large scale venue object covers the entire view of the digital map interface.

According to another example embodiment provided herein, both a normal scale venue and a local model object may be generated for a venue. In response to a zoom-in input when the digital map reaches a threshold zoom or a maximum zoom level, a normal scale venue may be replaced with a local model object. The local model object would be of a scale equivalent to the normal scale venue, though it would contain more detail and a higher level of granularity than the venue provided for display on the digital map. The local model object is an object that can be scaled to enable a user to see more detail of the local model object. A user may continue to provide an input corresponding to a zoom-in input, and the local model object will be enlarged in a corresponding fashion. As the digital map is at a maximum zoom level while enlarging the local model object, the map may be hidden as described above. One advantage of an example embodiment including the local model approach is that there is no practical limit for zooming in. The local model may be as detailed and granular as desired by the developer of the model.

FIG. 5 illustrates a graph of an example embodiment of the process for zooming including adaptive venue zooming beyond the maximum zoom limit of a digital map. As shown, the graph includes a zoom level on the y-axis 402, and a scale on the x-axis 404. The zoom level of the illustrated embodiment includes a maximum zoom level of a digital map to be zoom level 20. The scale increases with each zoom level. Conventionally, zoom and scale are associated linearly as shown by line 406. However, the maximum zoom level of the digital map peaks at level 20, such that zoom levels above 20 are not possible with the digital map.

According to an example embodiment as illustrated in FIG. 5, a venue may be depicted on a digital map at the zoom level corresponding to point 412 along dotted line 408. An illustration of the venue depicted at the zoom level represented at 412 is illustrated in image A of FIG. 6. In response to a user input to zoom-in further, it may be determined that a venue exists in the field of view that has a corresponding venue object. This determination may be made, for example, in response to the field of view including a geographic point (e.g., longitude and latitude), that corresponds to an anchor point of a venue. An anchor point may be a point of a venue that is used as a reference point for the venue and corresponding venue object. If the field of view includes such an anchor point, a corresponding venue object may be retrieved, such as by processing server 102 from venue object database 111.

The venue object may have a maximum scale, such as a scale that is four times bigger than a base scale venue (e.g., a venue scale shown at the maximum zoom level of the digital map). In order for the venue object to be presented on the display in a seamless manner with the venue of the digital map, the venue object may be scaled down, in this case four times smaller than the full scale venue object, to achieve the scale of the venue on the digital map at maximum zoom level. Alternatively, as noted above, a local model object may be used, in which case the local model object may not require scaling down to correspond to the scale of the digital map at the maximum zoom level. FIG. 6, image B represents the venue of the digital map at maximum zoom level 20 depicted in FIG. 5 at 414, while FIG. 6 image C represents the venue object that the display transitions to present in response to the zoom level reaching the threshold value depicted in FIG. 5 at 416. As shown, the venue object is depicted in image C at the same scale as the venue of the digital map in image B. The venue object is down-scaled from full scale to be the same size as that of the venue of the digital map in order to ensure a smooth transition and seamless zoom progression from the digital map to the augmented venue zoom. Once the venue object is provided for display at 416, the a virtual zoom operation can commence from zoom level 18 (now virtual level 20), to level 20 (now virtual level 22), where the venue object is presented at four times the scale of the venue in the maximum zoom level of the digital map, as depicted in FIG. 6 image D.

In order to smoothly transition from the zooming action on the digital map to the adaptive zoom on the venue object, it is imperative that the transition from the presentation of the map of the region including a venue to a presentation of a venue object corresponding to the venue within the region is performed in a smooth and seamless manner. As such, in response to receiving an input corresponding to a zoom-in action, where the zoom-in action results in a zoom level at or above a threshold zoom level, the digital map interface may transition from the presentation of the map of the region to the presentation of the venue object within the region, provided the zoom-in action is zooming in on the venue corresponding to the venue object. This transition may occur through a subtle replacement of the venue of the digital map with the venue object during the zoom-in action, or possibly after the zoom-in action has occurred. The transition may include a fade, morph, quick replacement, or the like.

The virtual zooming of a venue is enabled by the venue object, which exists as a model of the venue stored separately from the map data (e.g., in venue object database 111), and associated with the map data by virtue of the anchor point or reference point of the venue to which it is associated. Venue objects may be two-, or preferably three-dimensional models that may be stored in JSON (Java Script Object Notation) or in binary format, for example. A venue object may be called upon or referenced in response to a venue having a corresponding venue object being within a defined geo-area or region that is presented in a digital map interface. The client (e.g., mobile device 104), may receive the venue object from the map data service provider 108 or it may be stored on a local client cache.

The venue objects of example embodiments may be georeferenced by their anchor or reference points, and may include reference points to the outer extents of the venue itself in geographic coordinates, as well as each space of a venue representing the physical dimensions within a certain tolerance in the digital map. The color of a venue object may be defined by custom schemes that may make venue objects readily discerned by a user and certain color-coded features easily understood. A scale factor of a venue object may be established based on the level of detail that is desired to be presented to users. For example, if a scale factor is two, and if zoom level is increased by one, the scale may be doubled, and the resulting georeferenced venue model has dimensions that are two times larger than the original model. According to an example, if the features of a venue are sufficiently distinguished with a scale of four-times the size visible in the highest zoom level of a digital map, with virtual zooming beginning at level 18, the venue object would be presented at twice the size of the venue at zoom level 20 at virtual zoom level 19, and four times the size of the venue at zoom level 20 at virtual zoom level 20.

The three dimensional data model of an example embodiment of a venue object may include one or more polygons that are georeferenced to the digital map. The polygon(s) may represent the outer extents of the venue or space associated with the venue object. Venues may include multiple floors, such that floor information may be used to calculate the height of the space. Further, venue objects may be presented in distinctive ways based on the type of venue. For example, a restaurant venue object may be presented through a visualization that depicts the table layout, the types of tables (booth, high-top table, 2-person table, etc.), and their location with respect to the kitchen, bathrooms, patios, entrances, etc. A supermarket venue object may be presented through a visualization that depicts the layout of store shelves and various departments of the supermarket. These categories of venues may define color schemes, visualization standards, or other settings that may help a user more easily interpret the venue objects.

According to example embodiments described herein, a venue object may be displayed in a virtual, adaptive zoom level that is greater than the maximum zoom level of a corresponding digital map. Accordingly, the digital map may be omitted during the virtual, adaptive zoom beyond the maximum zoom level of the digital map. As the level of detail on the map is not increased in a virtual zoom beyond the maximum zoom level, zooming beyond the maximum zoom level of the map would not provide substantial benefit to the presentation of the digital map, such that it may be omitted in some circumstances. Alternatively, the digital map, at its maximum zoom level, may be enlarged to correspond to the scale of the virtual object. While this digital map representation may provide no further detail than the digital map in maximum zoom level, and the enlarged digital map may lose resolution or become pixelated, the enlarged view of the digital map at least partially surrounding the venue object may provide context, particularly when a route or feature is being presented that extends from outside the venue to inside the venue object.

While the example embodiment of FIGS. 5 and 6 depict a single venue object replacing a representation of a single venue in a digital map, according to some embodiments, if a digital map includes multiple venues that are visible in the maximum zoom level of the digital map, a venue object for each visible venue may be retrieved and provided for display in the adaptive virtual zooming of the venue objects.

Embodiments described herein may be implemented through a user interface, such as user interface 28 of apparatus 20, which may provide for presentation of the digital map and may support inputs corresponding to a zoom-in function, such as a pinch gesture. The apparatus 20 may further be configured to obtain the venue object(s) including the three dimensional model from the map data service provider 108, and may locally cache the venue object(s) in memory 26. The venue objects for a specific region may each be cached as a user zooms in on that specific region, or pans to that specific region. In this manner, a venue object may be readily available upon the user zooming in to a venue, and the venue object may replace the venue in a seamless visual transition.

According to some embodiments, the apparatus 20 may further comprise a mesh converter, such as in processor 24, which converts georeferenced model data of the venue object to a three-dimensional mesh and creates renderable map objects. Those renderable map objects may include an object for the base scale (e.g., the scale corresponding to the maximum zoom level of the digital map) and an enlarged scale, corresponding to one or more of the maximum zoom levels of the virtual zoom. The apparatus 20 may further be configured to add or remove digital map features as necessary during zooming in and zooming out.

Using the aforementioned techniques, it is possible to provide a virtual zoom within venue objects for zoom levels up to 40, or double the maximum zoom level or scale of the corresponding digital map, for rendering extremely small details (e.g., fractions of an inch or millimeter level accuracy). The maximum zoom level of a venue object may be dependent upon the smallest detail object within the venue object. For example, a maximum zoom level may be established as the zoom level that provides a user with a discernable view of a particular feature that is included in the venue object. In the case of a supermarket, for example, the smallest feature within the venue object may be a display area for a product that is two feet (or 61 centimeters) across. The maximum zoom level for the adaptive zoom of the venue object may be established as a "zoom level 26", where the displayed region is approximately 8 feet (or 2.4 meters) across. This adaptive zoom feature can support advanced internet-of-things (IoT) use cases without the need to zoom a surrounding digital map, which is often irrelevant once you zoom beyond the maximum zoom level of the digital map. The user experience may be improved in venues with many and small features, such as department stores with individual aisle mapping. In such a case, a user can see or select even very small features.

According to some example embodiments, the adaptive zoom interface of a venue object may enable a user to zoom in on three-dimensional model of a venue. The three-dimensional model may be presented in a perspective view to provide the user some indication of a height of the venue. However, the zoom feature of the venue object may not provide a consistent zoom along each axis of the three dimensional model. For example, as illustrated in FIG. 7, a simplified version of a 3D model of a venue object 432 is shown as presented in display 430. Image A of FIG. 7 depicts a first level of zoom in which the venue object appears with a first length in the x-axis, y-axis, and z-axis directions, with the axes defined as shown by 436. Upon increasing the zoom level, as shown in image B of FIG. 7, the enlarged venue object has been enlarged along the x-axis and y-axis, but not along the z-axis relating to the height of the venue. This zoom effect may provide a user a better understanding of the height of an object within a limited viewing perspective of the display 430.

Venue objects, such as those stored in venue object database 111 may include information or instructions embedded therein that define how the venue object is to be rendered, and may define the maximum zoom level of the venue object. Each venue object may be rendered according to rules and instructions specific to that venue object such that the data and instructions stored in the venue object define the interaction in the adaptive zoom interface. Such instructions may further enable development of unique user interface aspects of different types of venues. For example, if a venue is a theater, the venue object may include instructions for enabling adaptive zooming to focus in on a single seat of the theater, and provide a view of the stage from the single seat of the adaptive zoom focus.

FIG. 8 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 illustrates a method for providing for adaptive venue zooming in a digital map interface beyond the limits of a maximum zoom level of the digital map itself. According to the illustrated flowchart, the method may include providing for presentation of a map of a region including a venue within the displayed region, as shown at 510. An input may be received at 520 corresponding to a zoom-in action to view an enlarged portion of the region, where the enlarged portion of the region includes the venue. A transition may occur from the presentation of the map of the region to a presentation of a venue object corresponding to the venue in response to receiving the input corresponding to a zoom-in action. The venue object may include a three-dimensional model of the venue, and the venue object may initially be presented in a scale corresponding to a view of the enlarged portion of the region.

FIG. 8 further illustrates optional elements of a method for providing adaptive venue zooming as evidenced by the dashed lines around the elements. The optional elements include receiving an input during presentation of the venue object corresponding to a zoom-in action to view an enlarged version of the venue object as shown at 540. In response to the input, the method may include providing for display of the enlarged venue object in a zoom level greater than a maximum zoom level available for presentation of the map, as shown at 550. For example, if the map has a maximum zoom level of 20 or a maximum zoom of 250 feet across a display, the enlarged venue object may be presented in a higher zoom level, such as zoom level 22, or a zoom of 67 feet across the display.

In an example embodiment, an apparatus for performing the method of FIG. 8 above may comprise a processor (e.g., the processor 24) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
provide for presentation of a map of a region including a venue;
receive an input corresponding to a zoom-in action to view an enlarged portion of the region, wherein the enlarged portion of the region comprises the venue;
in response to receiving the input corresponding to a zoom-in action to view the enlarged portion of the region, transition from the presentation of the map of the region to a presentation of a venue object corresponding to the venue, wherein the venue object is a three-dimensional model of the venue, and wherein the venue object is initially presented in a scale corresponding to a scale of a view of the enlarged portion of the region;
receive an input during presentation of the venue object corresponding to a zoom-in action to view an enlarged venue object; and
provide for display of the enlarged venue object, wherein the enlarged venue object is provided for display in a zoom level greater than a maximum zoom level available for presentation of the map.

2. The apparatus according to claim 1, wherein causing the apparatus to provide for display of the enlarged venue object further comprises causing the apparatus to provide for display of the three-dimensional model of the venue in an enlarged view in which the three-dimensional model is enlarged along an x-axis and a y-axis, but not enlarged along a z-axis corresponding to a height of the model, wherein the z-axis is orthogonal to a plane defined by the x-axis and y-axis.

3. The apparatus according to claim 1, wherein the apparatus is further configured to:
provide for display of a portion of the map in a virtual zoom level corresponding to a scale of the enlarged venue object, wherein the virtual zoom level comprises an enlarged view of the portion of the map greater than the maximum zoom level of the map.

4. The apparatus of claim 3, wherein the virtual zoom level corresponds to a view of an enlarged venue object at a zoom level lower than the maximum zoom level of the map.

5. The apparatus according to claim 1, wherein the venue in the map of the region comprises an anchor point, wherein the venue object comprises an anchor point, and wherein transitioning from the presentation of the map of the region to a presentation of a venue object corresponding to the venue comprises aligning the anchor point of the venue object with a position on a display of the anchor point of the venue.

6. The apparatus according to claim 1, wherein the venue object comprises embedded information for rendering an enlarged version of said venue object.

7. A computer program product comprising at least one non-transitory computer-readable storage medium having computer-executable program code instructions stored therein, the computer-executable program code instructions comprising program code instructions to:
provide for presentation of a map of a region including a venue;
receive an input corresponding to a zoom-in action to view an enlarged portion of the region, wherein the enlarged portion of the region comprises the venue;
in response to receiving the input corresponding to a zoom-in action to view the enlarged portion of the region, transition from the presentation of the map of the region to a presentation of a venue object corresponding to the venue, wherein the venue object is a three-dimensional model of the venue, and wherein the venue object is initially presented in a scale corresponding to a scale of a view of the enlarged portion of the region;
receive an input during presentation of the venue object corresponding to a zoom-in action to view an enlarged venue object; and provide for display of the enlarged venue object, wherein the enlarged venue object is provided for display in a zoom level greater than a maximum zoom level available for presentation of the map.

8. The computer program product according to claim 7, wherein the program code instructions to provide for display of the enlarged venue object comprises program code instructions to:

provide for display of the three-dimensional model of the venue in an enlarged view in which the three-dimensional model is enlarged along an x-axis and a y-axis, but not enlarged along a z-axis corresponding to a height of the model, wherein the z-axis is orthogonal to a plane defined by the x-axis and y-axis.

9. The computer program product of claim 7, further comprising program code instructions to:

provide for display of a portion of the map in a virtual zoom level corresponding to a scale of the enlarged venue object, wherein the virtual zoom level comprises an enlarged view of the portion of the map greater than the maximum zoom level of the map.

10. The computer program product according to claim 9, wherein the virtual zoom level corresponds to a view of an enlarged venue object at a zoom level lower than the maximum zoom level of the map.

11. The computer program product according to claim 7, wherein the venue in the map of the region comprises an anchor point, wherein the venue object comprises an anchor point, and wherein the program code instructions to transition from the presentation of the map of the region to a presentation of a venue object corresponding to the venue comprises program code instructions to align the anchor point of the venue object with a position on a display of the anchor point of the venue.

12. The computer program product according to claim 7, wherein the venue object comprises embedded information for rendering an enlarged version of said venue object.

13. A method comprising:

providing for presentation of a map of a region including a venue;

receiving an input corresponding to a zoom-in action to view an enlarged portion of the region, wherein the enlarged portion of the region comprises the venue;

in response to receiving the input corresponding to a zoom-in action to view the enlarged portion of the region, transitioning from the presentation of the map of the region to a presentation of a venue object corresponding to the venue, wherein the venue object is a three-dimensional model of the venue, and wherein the venue object is initially presented in a scale corresponding to a scale of a view of the enlarged portion of the region;

receiving an input during presentation of the venue object corresponding to a zoom-in action to view an enlarged venue object; and providing for display of the enlarged venue object, wherein the enlarged venue object is provided for display in a zoom level greater than a maximum zoom level available for presentation of the map.

14. The method according to claim 13, wherein providing for display of the enlarged venue object further comprises providing for display of the three-dimensional model of the venue in an enlarged view in which the three-dimensional model is enlarged along an x-axis and a y-axis, but not enlarged along a z-axis corresponding to a height of the model, wherein the z-axis is orthogonal to a plane defined by the x-axis and y-axis.

15. The method according to claim 13, further comprising:

providing for display of a portion of the map in a virtual zoom level corresponding to a scale of the enlarged venue object, wherein the virtual zoom level comprises an enlarged view of the portion of the map greater than the maximum zoom level of the map.

16. The method according to claim 15, wherein the virtual zoom level corresponds to a view of an enlarged venue object at a zoom level lower than the maximum zoom level of the map.

17. The method according to claim 13, wherein the venue in the map of the region comprises an anchor point, wherein the venue object comprises an anchor point, and wherein transitioning from the presentation of the map of the region to a presentation of a venue object corresponding to the venue further comprises aligning the anchor point of the venue object with a position on a display of the anchor point of the venue.

* * * * *